(12) United States Patent
Senoo (10) Patent No.: US 7,061,389 B2
(45) Date of Patent: *Jun. 13, 2006

(54) SEAT WEIGHING DEVICE

(75) Inventor: Tomotoshi Senoo, Shiga (JP)

(73) Assignee: Takata Corporation, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 10/846,621

(22) Filed: May 17, 2004

(65) Prior Publication Data

US 2004/0262956 A1 Dec. 30, 2004

(30) Foreign Application Priority Data

Jun. 27, 2003 (JP) .............................. 2003-184967
Feb. 5, 2004 (JP) .............................. 2004-029296

(51) Int. Cl.
*G08B 21/00* (2006.01)

(52) U.S. Cl. ...................... 340/667; 340/666; 177/45; 177/136; 177/144; 73/862.381; 297/344.1

(58) Field of Classification Search ............... 340/667, 340/666, 665; 174/45, 46, 47, 48, 136; 324/662; 177/45, 46, 47, 48, 136, 144, 184; 73/862.381; 297/344.1, 65.05, 65.11

See application file for complete search history.

(56) References Cited

U.S. PATENT DOCUMENTS

| 6,323,444 | B1 | 11/2001 | Aoki |
| 6,563,429 | B1 * | 5/2003 | Sakai et al. ................. 340/667 |
| 6,586,948 | B1 | 7/2003 | Aoki et al. |
| 6,774,804 | B1 * | 8/2004 | Sakai et al. ................. 340/665 |

FOREIGN PATENT DOCUMENTS

JP 2001-41813 A 2/2001

* cited by examiner

*Primary Examiner*—Davetta W. Goins
(74) *Attorney, Agent, or Firm*—Foley & Lardner LLP (57) ABSTRACT

A seat weighing device wherein a load transmitting member for transmitting the seat load to a load sensor is formed without extremely high precision required, thereby enabling simple manufacturing of the load transmitting member. The seat weighing device includes a base having an arm for transmitting the seat load to a load sensor. The arm does not include a V-shaped portion, but includes only a single action portion. The single action portion is mounted to a sensor plate for mounting the load sensor so as to transmit the seat weight from the single action portion to the sensor plate. The arm includes only the single action portion, thereby suppressing irregularities in transmission of the load.

8 Claims, 8 Drawing Sheets

SEAT WEIGHING DEVICE

BACKGROUND

The present invention relates to a seat weighing device, provided to a seat for a vehicle, for weighing a seat including the weight of a passenger on the seat.

As safety devices for improving safety of a passenger in an automobile, a seat belt device, an airbag device, and the like, are known. Recently, development of control devices for controlling these safety devices corresponding to the weight and the attitude of the passenger is being undertaken in order to further improve the performance of the seat belt or the airbag. For example, the control device adjusts the amount of the inflation gas or the inflation speed of the airbag, or adjusts the pretension of the seat belt, corresponding to the weight and the attitude of the passenger. Accordingly, there is the need to weigh the passenger on the seat, as well as the position of the center of gravity of the passenger.

In order to meet such a demand, a low-cost seat weighing device has been proposed for precisely weighing the seat as shown in, for example, Japanese Unexamined Patent Application Publication No. 2001-041813 (hereby incorporated by reference herein in its entirety).

Figure 6:
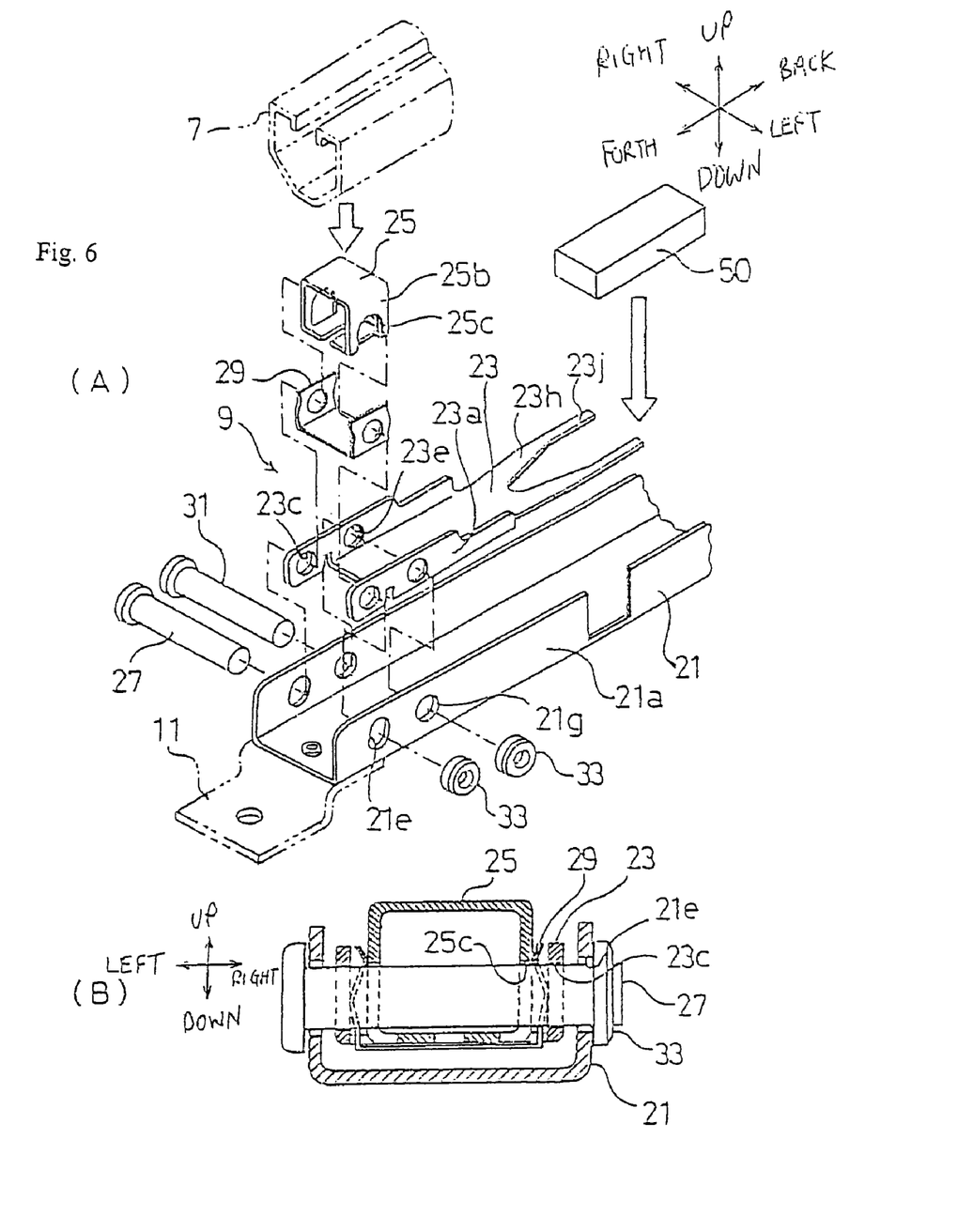
Figure 7:
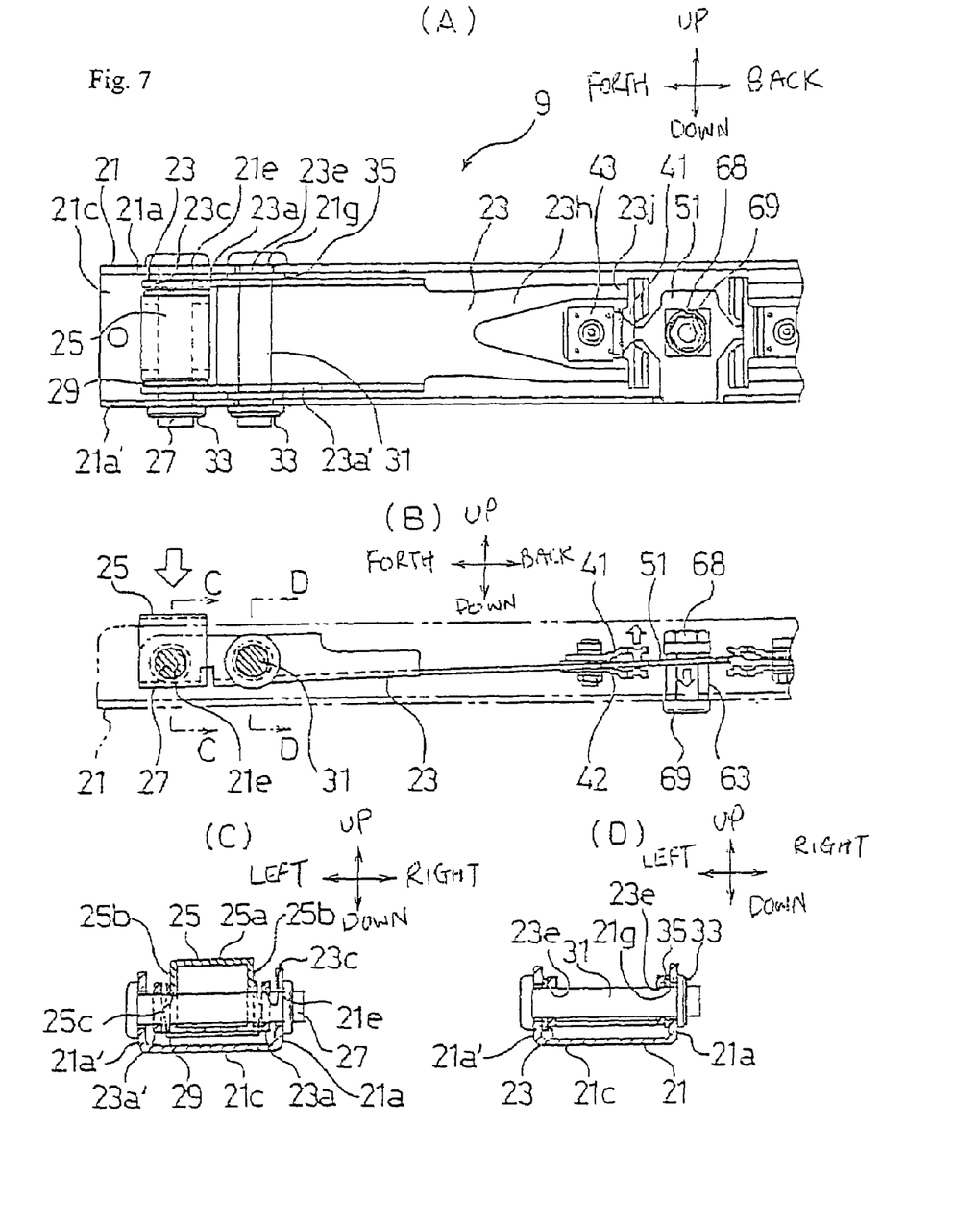
FIG. 7(A) is a plan view thereof.
FIG. 7(B) is a longitudinal cross-sectional view thereof.
FIG. 7(C) is a cross-sectional view taken along line C—C in FIG. 7(B)
FIG. 7(D) is a cross-sectional view taken along line D—D in FIG. 7(B).

FIG. 6 shows partial views of the front portion of the seat weighing device disclosed the aforementioned Japanese Unexamined Patent Application Publication No. 2001-041813, wherein (A) is a disassembled perspective view thereof, (B) is a cross-sectional front view of a pin-bracket portion thereof, and FIG. 7 shows partial views of the front portion of the seat weighing device shown in (A) and (B), wherein (A) is a plan view thereof, (B) is a cross-sectional view along the longitudinal direction thereof, (C) is a cross-sectional view taken along line C—C in (B), and (D) is a cross-sectional view taken along line D—D in (B).

As shown in FIGS. 6(A) and 6(B), and FIGS. 7(A) and 7(B), a conventional seat weighing device 9 comprises a long and narrow base 21 serving as a base component thereof. The base 21 is to be mounted on the vehicle body, extending long in the longitudinal direction thereof, and the base 21 formed of a U-shaped pressed steel frame is mounted with the open side facing upward, wherein both the left and right ends of a bottom plate 21c of the base are bent perpendicular thereto so as to form side plates 21a and 21a' erected on the bottom plate 21, as shown in FIGS. 7(C) and 7(D).

Each of the side plates 21a and 21a' of the base 21 include two pin openings 21e and 21g arrayed in the longitudinal direction of the base 21. Note that the pin openings 21e and 21g are formed on both the side plates 21a and 21a' so as to face the corresponding pin openings. The pin openings 21e closer to the front end are formed at positions around 1/8 of the entire length of the base 21 away from the front portion of the base 21 along the longitudinal direction thereof. The pin openings 21e are formed in the shape of a slot with the major axis perpendicular to the bottom plate 21c as shown in FIG. 6(A). The ends of a bracket pin 27 are inserted into the slots 21e. Furthermore, retainers 33 are secured to both the left and right ends of the bracket pin 27. The bracket pin 27 is fixed to the slot 21e by the retainers 33.

However, the bracket pin 27 is inserted into the slots 21e with a gap in both the horizontal and vertical directions, i.e., the bracket pin 27 is not in contact with the inner faces of the slots 21e in the normal state. However, in the event that an excessive load is applied to the seat weighing device 9 (specifically, the pin bracket 25), the bracket pin 27 moves downward and comes into contact with the lower edge of the slot 21e, and accordingly, the excessive load does not affect a load sensor 50 disposed on a sensor plate (spring member) 51. That is to say, the bracket pin 27 and the slots 21e form a part of the restricting mechanism for restricting the maximal load applied to the sensor plate 51. Note that the bracket pin 27 generally serves as a member for transmitting the weight of the seat applied to the pin bracket 25 to an arm 23 serving as a load transmitting member.

Furthermore, the pin openings 21g are formed at positions somewhat away from the slot 21e toward the middle portion of the base 21 (specifically, at positions approximately 1/10 of the entire length of the base 21 away from the slot 21e toward the middle portion). A base pin 31 passes through the pin openings 21g. The base pin 31 is disposed so as to be introduced between both the left and the right side plates 21a and 21a' of the base 21. Furthermore, retainers 33 are secured to both the left and right ends of the base pin 31 so as to fix the base pin 31 to the base 21. Note that the base pin 31 serves as a shaft around which the arm 23 is turned.

The arm 23 is formed of an elastic member, and is disposed within the base 21. The bottom plate of the arm 23 is formed in the shape wherein one end thereof closer to the middle portion of the base 21 is formed in the shape of "V" extending in the horizontal direction (V-shaped portion 23h), and the other end thereof closer to the front end of the base 21 is formed in the shape of a rectangle. Both the left and the right ends of a half part of the arm 23 closer to the front end of the base 21 are bent upward perpendicular to the bottom plate of the arm 23 so as to form side plates 23a. On the other hand, the V-shaped portion 23h is formed of a simple flat plate. The side plates 23a are disposed within the base 21 along the side plates 21a thereof. Note that the side plates 23a and 21a are disposed with a gap therebetween.

Each of the side plates 23a of the arm 23 include two pin openings 23c and 23e, as well. The bracket pin 27 passes through the pin openings 23c formed closer to the front end of the base 21. The bracket pin 27 hardly exhibits any sliding movement on the pin openings 23c. On the other hand, the base pin 31 passes through the pin openings 23e formed closer to the middle portion of the base 21. The base pin 31 serves as a center around which the arm 23 is turned, and accordingly, the base pin 31 exhibits sliding movement on the pin openings 23e corresponding to turning of the arm 23. Note that doughnut-shaped spacers 35 are fit to both the ends of the base pin 31 between the side plate 21a of the base 21 and the side plate 23a of the arm 23.

The V-shaped portion 23h of the arm 23 is formed with generally half of the entire length of the arm 23. The left and right ends of the V-shaped portion 23h are forked so as to extend toward the middle portion of the base 21 in the longitudinal direction, and are formed narrow closer to the middle portion. Action portions 23j at the tips of the V-shaped portion 23h of the arm 23 are introduced between a blade 41a of an upper half arm 41 and a blade 42a of a lower half arm 42. The lower face of the main body of the upper half arm 41 and the upper face of the main body of the lower half arm 42, formed flat, are fixed to a sensor plate 51 so as to be fit flush with the surface thereof with a screw 43.

Figure 8:
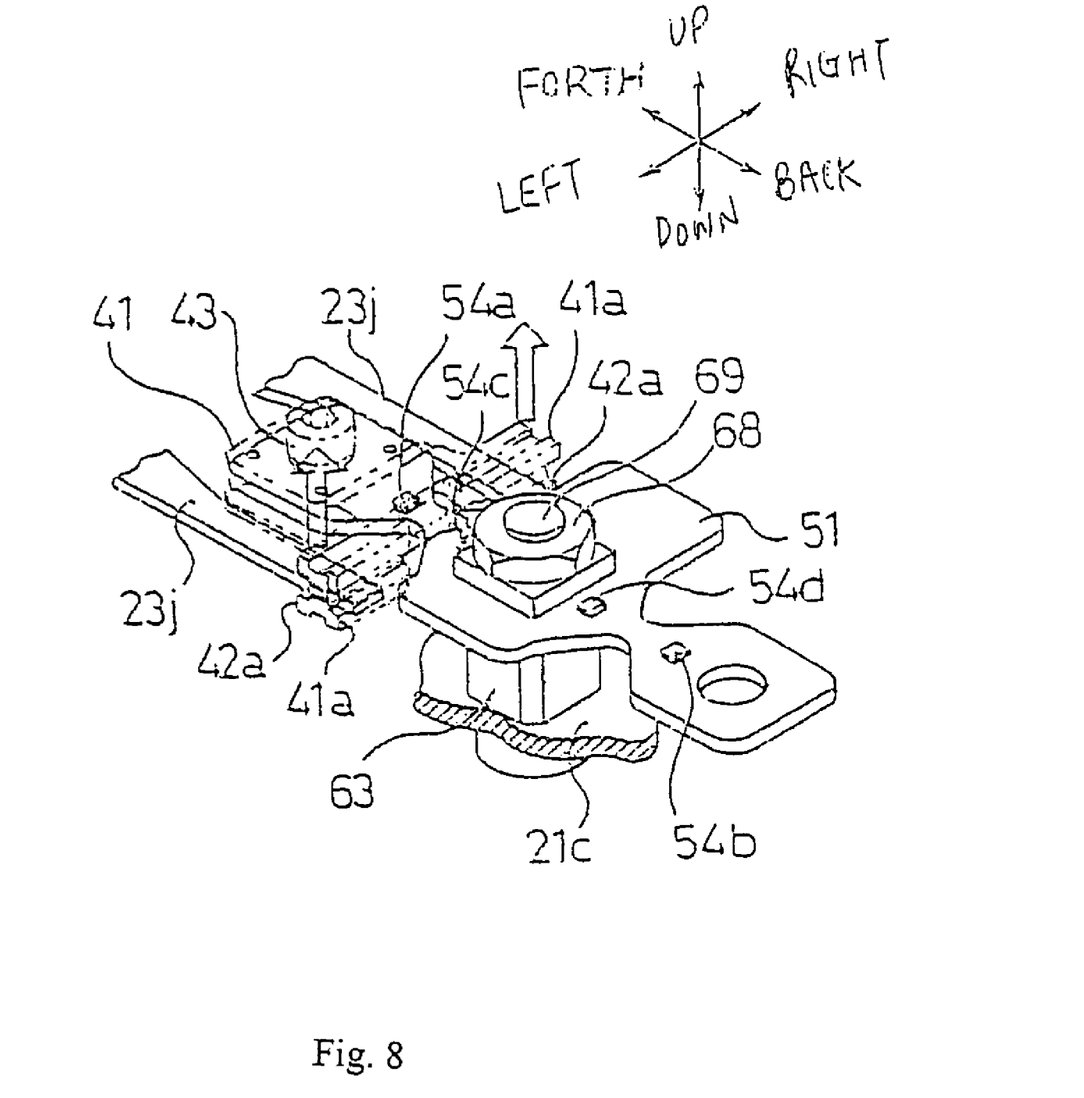
FIG. 8 is a partial perspective view which shows the load sensor portion of a conventional seat weighing device.

Upon a load being applied to the pin bracket 25, the load is applied to the arm 23, and as a result, the arm 23 is slightly turned (with the maximal turning angle of 5°) so as to transmit the load to the sensor plate 51 from the action portions 23j through the upper and lower half arms 41 and 42. As shown in FIG. 8, the load sensor 50 is mounted on the sensor plate 51. Of four deformation resistors forming the load sensor 50, two deformation resistors 54a and 54b thereof are disposed so as to detect the tensile strain, and the other two deformation resistors 54c and 54d are disposed so as to detect the compressive strain. Note that these four deformation resistors 54a, 54b, 54c, and 54d, are disposed in that order along the line passing through the center of the sensor plate 51 in the longitudinal direction thereof.

Furthermore, the aforementioned four deformation resistors 54a, 54b, 54c, and 54d, are electrically connected so as to form a bridge circuit. The pin bracket 25 is formed generally in a cross-sectional shape of "U" with the open side facing downward as shown in FIG. 7(C). Note that the bin bracket 25 is formed with length of around ½₀ of the base 21 in the longitudinal direction, which is not so long. Furthermore, the upper face 25a of the pin bracket 25 is formed flat so as to mount a seal rail 7. Note that the seat rail 7 is fixedly connected to the pin bracket 25 with screws or the like. Furthermore, the sensor plate 51 is fixed to a column 63 erected on the middle portion of the bottom plate 21c of the base 21 with nuts 68, and fastening members 69 such as screws, bolts, or the like.

Both left and right side plates 25b of the pin bracket 25 extend downward, and both the lower ends thereof are bent inward. The side plates 25b are disposed so as to be introduced between the side plates 23a and 23a' of the arm 23 with a predetermined gap. Furthermore, the side plates 25b include pin openings 25c. Note that the bracket pin 27 passes through the pin openings 25c. The pin openings 25c are formed with a greater size than the diameter of the bracket pin 27. The gaps between the pin openings 25c and the bracket pin 27 absorb the margin of error in the size of the seat and vehicle, and unintended deformation.

A spring plate 29 is disposed so as to be introduced between both the left and right side plates 25b of the pin bracket 25 and both the left and right side plates 23a of the arm 23. The spring plate 29 has a spring seat including openings for fitting the bracket pin 27 with a gap. The spring plate 29 forms a centering mechanism for forcing the pin bracket 25 toward middle portion. Such a centering mechanism forces the pin bracket 25 to be slidably positioned at a position as close to the middle as possible.

With the seat weighing device 9, the seal rail 7, pin bracket 25, the arm 23, the base 21, the seat bracket 11, and the like, form a connecting mechanism between the seat and the vehicle.

With the seat weighing device disclosed in Japanese Unexamined Patent Application Publication No. 2001-041813, the V-shaped portion 23h serves as a mounting portion of the arm 23 for mounting the sensor plate 51 for transmitting the seat load to the sensor plate 51. That is to say, the sensor plate 51 is mounted to the two action portions 23j at the tips of the V-shaped portion 23h. Accordingly, the two action portions 23j at the tips of the V-shaped portion 23h must be formed with extremely high precision so as to suppress irregularities in the action portions 23j (i.e., irregularities in transmission of the load from the action portions 23j to the sensor plate 51). This leads to difficulty in manufacturing the arm 23.

On the other hand, the four deformation resistors 54a, 54b, 54c, and 54d, are disposed in that order along the line passing through the center of the sensor in the longitudinal direction of the sensor plate 51, and accordingly, are not disposed at positions with the same distance from the center of the sensor. Accordingly, in the event that rapid change in the temperature of the surroundings occurs, the four deformation resistors 54a, 54b, 54c, and 54d, may not immediately reach the same temperature due to heat transmitted to the sensor plate 51 through the middle portion of the sensor, e.g., the fastening member 69, leading to a problem that the bridge formed of the four deformation resistors may lose the balance thereof.

SUMMARY

The present invention has been made in order to solve the above-described problems, and accordingly, it is an object thereof to provide a seat weighing device wherein extremely high precision is not required of the load transmitting member for transmitting the seat load to the load sensor, thereby facilitating manufacturing thereof.

Furthermore, it is another object of the present invention to provide a seat weighing device with stable sensitivity of the load sensor as well as having the advantage of being not readily affected by the surrounding temperature.

A seat weighing device, according to an embodiment of the invention, comprises a load sensor for weighing a seat for a vehicle including the weight of a passenger on the seat; a load transmitting member for transmitting the weight of the seat to the load sensor; and a base for supporting the load sensor and the load transmitting member, wherein the load transmitting member includes an action portion for transmitting the weight of the seat to the load sensor, and the action portion is mounted to the load sensor.

According to another embodiment of the present invention, the aforementioned load sensor is mounted to a sensor plate to which the load is transmitted, and the sensor plate includes a predetermined number of openings formed at positions near the load sensor.

Furthermore, an occupant detection device according to an embodiment of the present invention comprises a load sensor for weighing a seat for a vehicle including the weight of a passenger on the seat; a load transmitting member for transmitting the weight of the seat to a sensor plate for mounting the load sensor; and a base for supporting the load sensor and the load transmitting member, wherein the sensor plate is fixed to the base with a fastening member, and the load sensor includes a predetermined number of deformation resistors fixed to the sensor plate equidistant from the fastening member.

As can be clearly understood from the above description, with a seat weighing device according to embodiments of the present invention, the load transmitting member does not include a V-shaped portion, but includes only a single action portion for transmitting the weight of the seat to the load sensor, unlike the conventional arrangement, thereby suppressing irregularities in transmission of the load. Accordingly, manufacturing of the load transmitting member according to the present invention does not require extremely high precision, unlike the conventional load transmitting member having the V-shaped portion. This enables simple manufacturing of the load transmitting member with low costs.

The sensor plate, according to an embodiment of the present invention, includes a predetermined number of openings formed at positions near the load-sensor mounting position, thereby reducing the cross-sectional area of the sensor plate at a position near the load-sensor mounting position. Accordingly, the sensor plate readily deforms at a position near the load-sensor mounting position, and accordingly, deformation of the sensor plates exhibits a concentration at positions around the load-sensor mounting position, thereby stabilizing the sensitivity of the load sensor while improving durability against the torsional stress applied to the sensor plate. This enables the load sensor to measure the load in a sure manner.

Furthermore, according to another embodiment of the present invention, a predetermined number of deformation resistors are disposed with the same distance from the fastening member for the sensor plate, and accordingly, are not affected by the irregularities in heat transmitted to the sensor plate through the fastening member due to rapid change in the temperature, thereby preventing the bridge formed of the predetermined number of deformation resistors from losing balance thereof. Thus, more precise weighing of the seat can be made.

It is to be understood that both the foregoing general description and the following detailed description are exemplary and exemplary only and are not restrictive of the invention as claimed.

BRIEF DESCRIPTION OF THE DRAWINGS

These and other features, aspects, and advantages of the present invention will become apparent from the following description, appended claims, and the accompanying embodiments shown in the drawings, which are briefly described below.

FIGS. 2(A), 2(B) and 2(C) show views of the seat weighing device shown in FIG. 1, wherein

FIGS. 3(A) and 3(B) show views of a part of the seat weighing device shown in FIG. 1, wherein

FIGS. 4(A) and 4(B) show disassembled views of the load transmitting portion and the load sensor portion shown in FIGS. 3(A) and 3(B), wherein

FIGS. 6(A) and 6(B) show partial views of the front portion of the conventional seat weighing device, wherein FIG. 6 is a disassembled perspective view thereof, and FIG. 6(B) is a cross-sectional view as viewed from the front side.

FIGS. 7(A), 7(B), 7(C), and 7(D) show partial views of the front portion of the conventional seat weighing device shown in FIGS. 6(A) and 6(B), wherein

DESCRIPTION

Hereinafter, embodiments of the present invention will be described with reference to the attached drawings. Note that the same components as with the seat weighing device as shown in FIGS. 6(A) through 8 described above, disclosed in Japanese Unexamined Patent Application Publication No. 2001-041813, are denoted by the same reference numerals, and detailed description thereof will be omitted.

Figure 1:
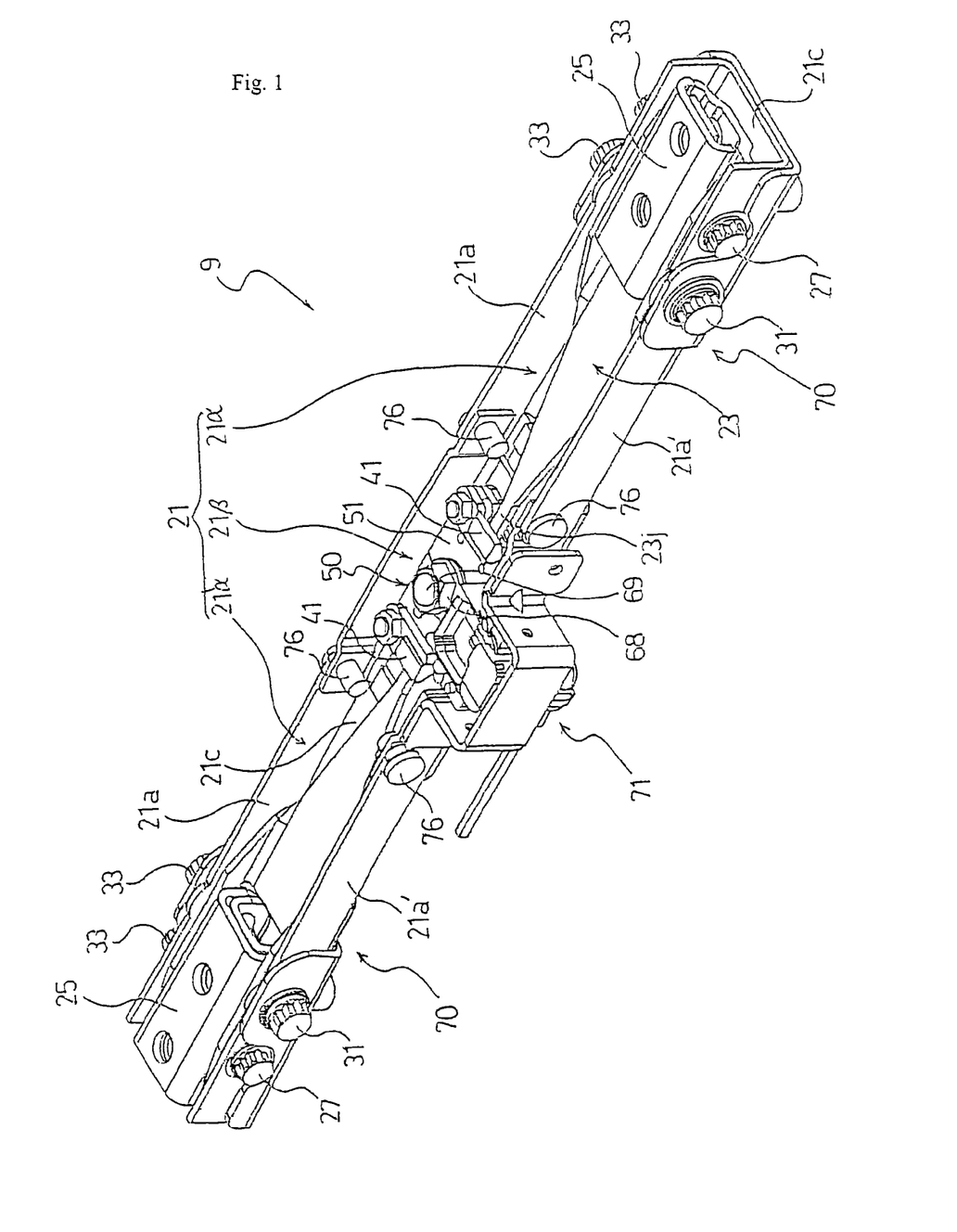
FIG. 1 is a perspective view which shows a seat weighing device according to an embodiment of the present invention.
Figure 2:
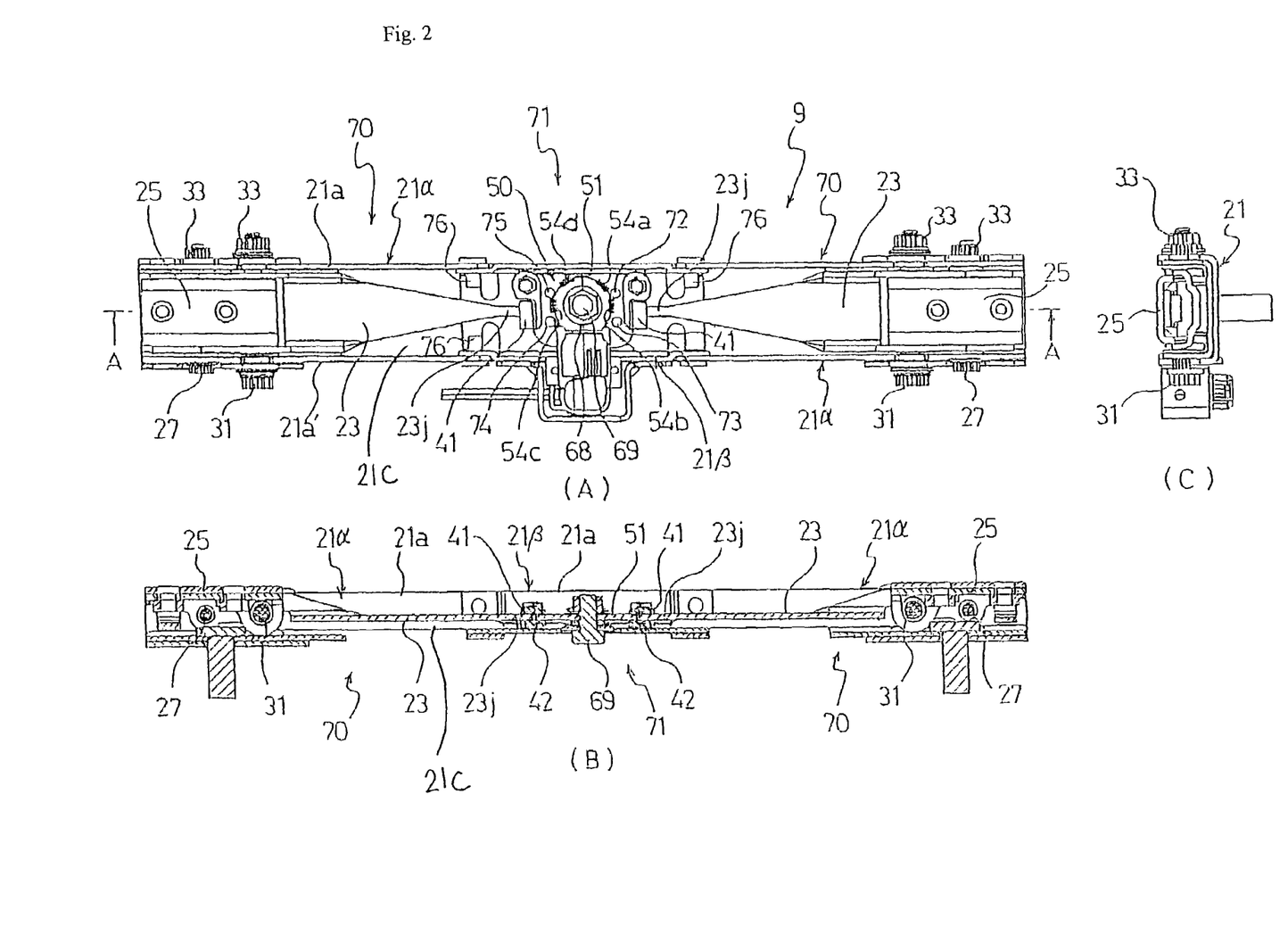
FIG. 2(A) is a plan view thereof.
FIG. 2(B) is a cross-sectional view taken long line A—A in FIG. 2(A)
FIG. 2(C) is a right side view thereof.

As shown in FIG. 1, and FIGS. 2(A), 2(B), and 2(C), the seat weighing device 9 comprises load transmitting portions 70 on the front side and the rear side, and a load sensor portion 71 disposed the aforementioned load transmitting portions 70, serving as separate components. Accordingly, the base 21 comprises two load transmission bases 21α for the load transmitting portions 70 on the front side and the rear side in the longitudinal direction, and the load sensor base 21β on the load sensor portion 71, serving as separate components. Note that the load transmitting bases 21α and the load sensor base 21β are formed in the cross-sectional shape of "U" in the same way as with the base 21 disclosed in Japanese Unexamined Patent Application Publication No. 2001-041813. In this case, while the two load transmitting bases 21α on the front side and the rear side are formed with generally the same size as with the base 21 disclosed in Japanese Unexamined Patent Application Publication No. 2001-041813, the load sensor base 21β is formed such that the bottom thereof is positioned at a shallow depth as compared with the load transmitting bases 21α. Furthermore, as shown in FIG. 2(B), both the front and rear ends of the bottom plate 21c of the load sensor base 21β are mounted on the bottom plate 21c of the two load transmitting bases 21α on the front and rear sides, respectively. In this state, the side plates 21a and 21a' of the load transmitting bases 21α, and the side plates 21a and 21a' of the load sensor base 21β, are connected with connecting members 76 such as four bolts or the like, whereby the entire base 21 is formed. Note that the aforementioned base 21 is formed such that the side plates 21a and 21a' of the two load transmitting bases 21α, and the side plates 21a and 21a' of the load sensor base 21β, are positioned at the same height.

Figure 3:
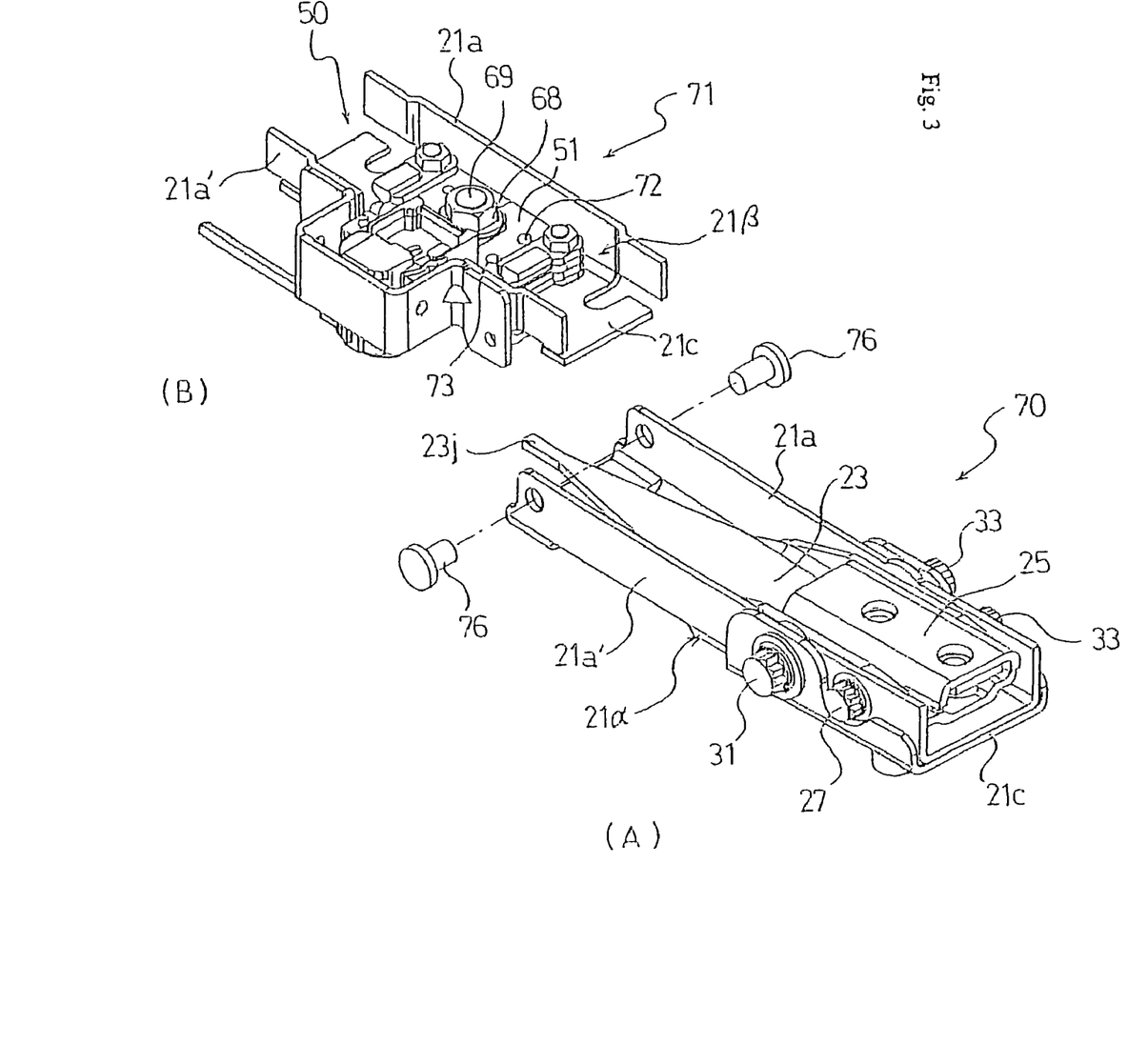
FIG. 3(A) is a perspective view which shows a load transmitting portion.
FIG. 3(B) is a disassembled perspective view which shows a load sensor portion.
Figure 4:
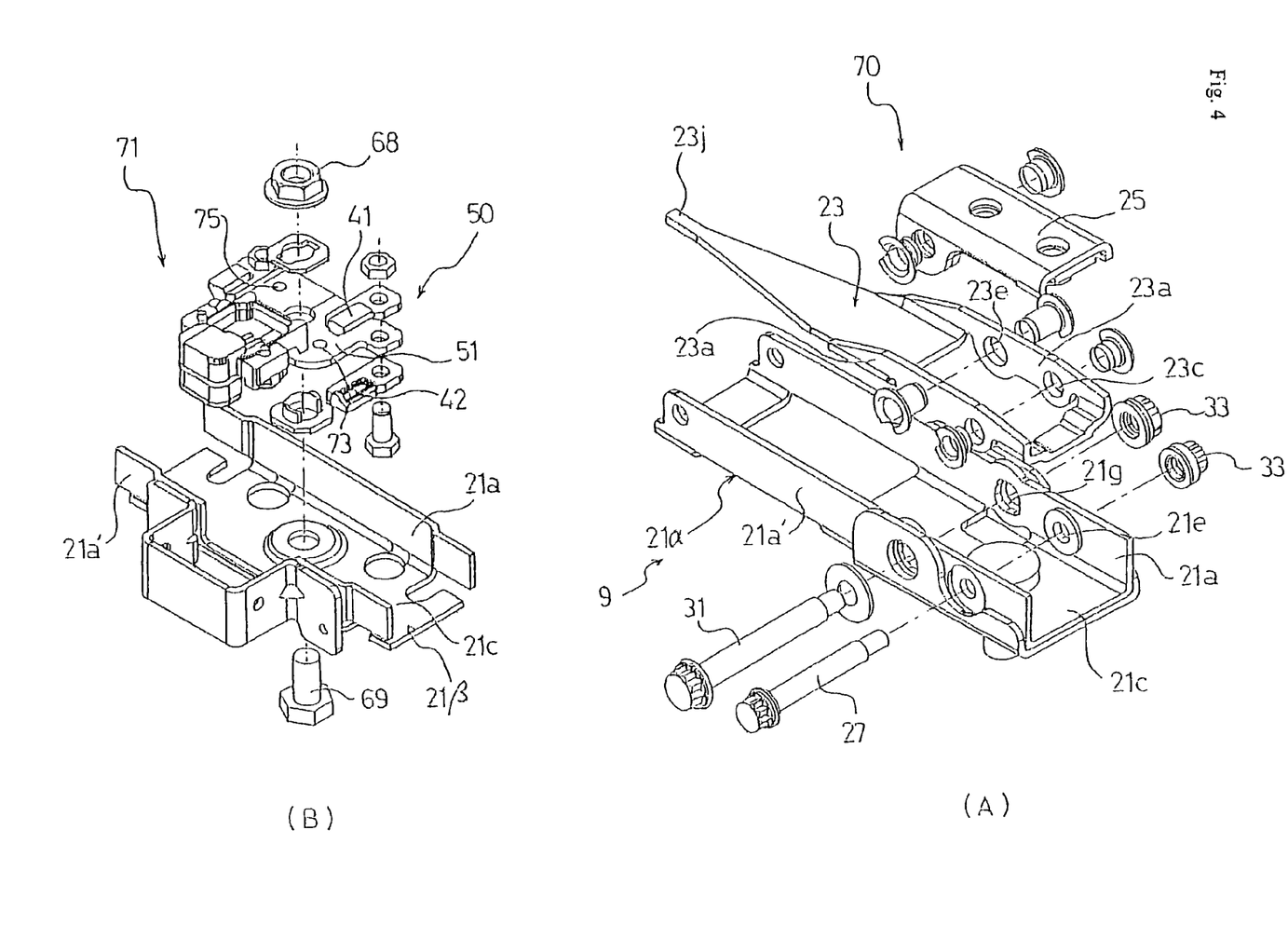
FIG. 4(A) is a disassembled perspective view which shows the load transmitting portion.
FIG. 4(B) is a disassembled perspective view which shows the load sensor portion.

As shown in FIG. 3(A) and FIG. 4(A), the load transmitting base 21α of the load transmitting portion 70 on the rear side includes the pin bracket 25 for receiving the seat weight, and the arm 23 for receiving the seat weight from the pin bracket 25, therewithin. While the arm 23 is formed of an elastic member, the arm 23 does not include a V-shaped portion having the two action portions 23j, but includes a single tip serving as the action portion 23j. The aforementioned single action portion 23j is mounted to the sensor plate 51 through the upper and lower half arms 41 and 42 so as to transmit the seat weight from the arm 23 to the sensor plate 51 through the half arms 41 and 42, as shown in FIG. 1, and FIGS. 2(A) and 2(B).

The arm 23 has the same configuration as with the arm 23 disclosed in Japanese Unexamined Patent Application Publication No. 2001-041813, except for the above-described configuration, wherein the arm 23 is turnably supported by the side plates 21a and 21a' of the base 21 through the base pin 31. Furthermore, the bracket pin 27 passes through the side plates of the arm 23 so as to transmit the seat weight from the pin bracket 25 to the arm 23 through the bracket pin 27.

Furthermore, the pin bracket 25 is turnably supported by the base pin 31 so as to transmit the seat weight applied to the pin bracket 25 to the bracket pin 27.

The load transmitting portion 70 on the front side has the same configuration as with the load transmitting portion 70 on the rear side described above, symmetrically in the longitudinal direction.

Figure 5:
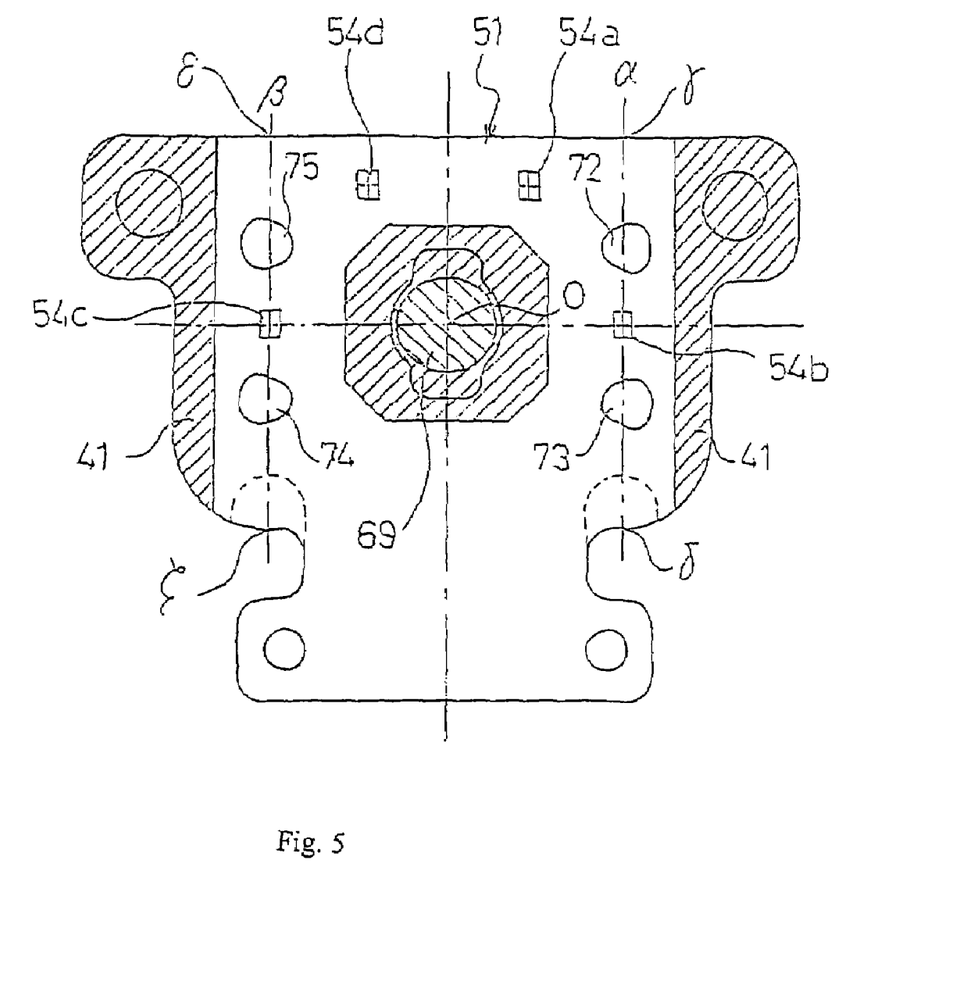
FIG. 5 is a plan view which shows a sensor plate where deformation resistors are fixed.

Furthermore, as shown in FIG. 2(A) and FIG. 5, with the seat weighing device 9 according to an embodiment of the present invention, a predetermined number (four in a example shown in the drawing) of deformation resistors 54a, 54b, 54c, and 54d, are fixed (mounted) onto the sensor plate 51 so as to be positioned on a single circle with the center O of the sensor (the center of the fastening member 69) as the center of the circle. That is to say, the four deformation resistors 54a, 54b, 54c, and 54d, are disposed with the same distance from the center O of the sensor (the center of the fastening member 69). The seat weighing system 9 may include a different, suitable number of strain resistors, other than four.

Furthermore, the sensor plate 51 includes a predetermined number (four in an example shown in the drawing) of openings 72, 73, 74, and 75, near the fixing positions (mounting positions) for the two deformation resistors 54b and 54c. The aforementioned openings 72, 73, 74, and 75, are formed on lines α and β, which pass through the fixing positions of the two deformation resistors 54b and 54c, parallel to the axis of the bending moment applied to the sensor plate 51 due to the load transmitted through the upper and lower half arms 41 and 42, so as to introduce the two deformation resistors 54b and 54c therebetween. These openings 72, 73, 74, and 75, reduce the cross-sectional area of the sensor plate 51 along the lines α and β, and thus the sensor plate 51 readily deforms at the fixing positions for the deformation resistors 54a, 54b, 54c, and 54d. Thus, measurement of the load can be performed with the deformation resistors 54a, 54b, 54c, and 54d, in a sure manner. The sensor plate may include more or less than four holes, as suitable.

Note that an arrangement may be made, wherein recesses are formed on the edges γ, δ, ε, and ξ (the edges δ and ξ are denoted by dotted lines as an example. Edges (not shown) γ and ε are formed in the same way) on the sensor plate 51, where the aforementioned lines α and β pass through, so as to reduce the cross-sectional area of the sensor plate 51 along the lines α and β so that the sensor plate 51 readily flexes (deforms), instead of formation of the openings 72, 73, 74, and 75. However, in this case, the edges γ, δ, ε, and ξ, have been cut off from the sensor plate 51, and accordingly, the sensor plate 51 is susceptible to torsional stress. This leads to deterioration in precision for measurement of the load. On the other hand, according to an embodiment of the invention, with an arrangement including the openings 72, 73, 74, and 75, the edges γ, δ, ε, and ξ, have not been cut off from the sensor plate 51, and accordingly, the sensor plates 51 has sufficient durability against torsional stress, thereby improving the precision for measurement of the seat load with the deformation resistors 54a, 54b, 54c, and 54d.

Furthermore, as shown in FIG. 2(B), the fastening member 69 is inserted so as to pass through the opening of the bottom plate 21c and the opening of the sensor plate 51 from the lower side of the bottom plate 21c of the load sensor base 21β of the load sensor portion 71 so as to be fixed by the nut 68, whereby the sensor plate 51 is fixed to the load sensor base 21β. In this embodiment, the load sensor base 21β is formed with a shallower bottom for mounting the fastening member 69 as compared with the load transmitting bases 21α, and accordingly, even in the event that the fastening member 69 is fixed so as to protrude downward from the bottom plate 21c of the load sensor base 21β, the irregularities in the height are suppressed over the entire base 21.

The seat weighing device 9 according to an embodiment of the invention includes the same configuration as with the seat weighing device disclosed in FIG. 6(A) through FIG. 8 described above, except for the above-described configuration.

With the seat weighing device 9 according to another embodiment of the invention, the seat weight transmitted to the arm 23 is transmitted to the sensor plate 51 through the single action portion 23j. As described above, the arm 23 does not include the V-shaped portion, but includes the single action portion 23j, thereby suppressing irregularities in transmission of the load. Accordingly, the arm 23 may be manufactured with low precision as compared with the arm 23 including the V-shaped portion. Thus, the arm 23 can be easily manufactured with low costs.

Furthermore, the base 23 is formed of the two load transmitting bases 21α and the load sensor base 21β, serving as separate components, thereby enabling sub-assembly of the load transmitting portion 70 and the load sensor portion 71, separately one from another. This facilitates assembly of the seat weighing device 9. Furthermore, the load sensor base 21β, of the load sensor portion 71 is formed with a shallow bottom as compared with the load transmitting base 21α, i.e., the load sensor base 21β is formed with smaller height than with the load transmitting base 21α, thereby suppressing irregularities in the height over the entire set weight measurement device 9 including the base 21, even if the fastening member 69 protrudes from the bottom plate 21c of the load sensor base 21β.

Furthermore, the four deformation resistors 54a, 54b, 54c, and 54d, are disposed with the same distance from the center of the sensor (the center of the fastening member 69), and accordingly, the four deformation resistors 54a, 54b, 54c, and 54d, are not non-uniformly affected by the heat transmitted to the sensor plate through the fastening member due to rapid change in the temperature, thereby preventing the bridge formed of the four deformation resistors 54a, 54b, 54c, and 54d, from losing balance. Thus, more precise weight of the seat can be obtained.

Furthermore, the sensor plate 51 includes four openings 72, 73, 74, and 75, at positions near the two deformation resistors 54b and 54c, thereby reducing the cross-sectional area of the sensor plate 51 at a position near the load sensor mounting position. Accordingly, the sensor plate 51 readily flexes (is readily deformed) around the load-sensor mounting position, and accordingly, deformation of the sensor plates 51 exhibits a concentration at positions around the load-sensor mounting position, thereby stabilizing the sensitivity of the load sensor while improving durability against the torsional stress applied to the sensor plate. Thus, the measurement of the load can be made with the load sensor in a sure manner.

Note that while description has been made regarding the base 23 formed of the separate three components in the above-described embodiment, the base 23 according to an embodiment of the present invention is not restricted to the aforementioned arrangement, rather, an arrangement may be made wherein the base 23 is formed of a single component.

The seat weighing device according to an embodiment of the present invention is mounted to a seat of a vehicle where height is restricted, and is suitably used for weighing a seat including the weight of a passenger on the seat.

Japan Patent Application No. 2003-184967, filed Jun. 27, 2003, including the specification, drawings, claims and abstract, is incorporated by reference herein in its entirety. Japan Patent Application No. 2004-029296, filed Feb. 5, 2004, including the specification, drawings, claims and abstract, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims

What is claimed is:

1. A seat weighing device comprising:
   a load sensor for weighing a seat for a vehicle including the weight of a passenger on the seat;
   a load transmitting member for transmitting the weight of said seat to said load sensor; and
   a base for supporting said load sensor and said load transmitting member;
   wherein said load transmitting member includes an action portion for transmitting the weight of said seat to said load sensor; and
   wherein said action portion is mounted to said load sensor.

2. The seat weighing device of claim 1, wherein said load sensor is mounted to a sensor plate to which said load is transmitted,
   and wherein said sensor plate includes a predetermined number of openings formed at positions near said load sensor.

3. The seat weighing device of claim 2, wherein the sensor plate is configured to deform at a position adjacent the load-sensor mounting position.

4. The seat weighing device of claim 1, wherein the load transmitting member comprises an elastic member.

5. The seat weighing device of claim 1, wherein the load transmitting member includes a single tip.

6. The seat weighing device of claim 1, wherein the load transmitting member is turnably supported by a side plate.

7. An occupant detecting device comprising:
   a load sensor for weighing a seat for a vehicle including the weight of a passenger on the seat;
   a load transmitting member for transmitting the weight of said seat to a sensor plate for mounting said load sensor; and
   a base for supporting said load sensor and said load transmitting member;
   wherein said sensor plate is fixed to said base with a fastening member; and
   wherein said load sensor includes a predetermined number of deformation resistors fixed to said sensor plate equidistant from said fastening member.

8. The occupant detecting device of claim 7, wherein the deformation resistors are configured to be uniformly affected by heat transmitted to the sensor plate.

* * * * *